(12) United States Patent
Eckstein et al.

(10) Patent No.: US 12,337,524 B2
(45) Date of Patent: Jun. 24, 2025

(54) MODIFYING PRINT DATA NEAR AND/OR AT OVERLAP AREAS BETWEEN PRINTHEAD DIES

(71) Applicant: Peridot Print LLC, Palo Alto, CA (US)

(72) Inventors: Yuval Eckstein, Sant Cugat del Valles (ES); Luis Garcia Garcia, Sant Cugat del Valles (ES); Adrien Chiron, Sant Cugat del Valles (ES)

( * ) Notice: Subject to any disclaimer, the term of this patent is extended or adjusted under 35 U.S.C. 154(b) by 253 days.

(21) Appl. No.: 17/417,728

(22) PCT Filed: Aug. 27, 2019

(86) PCT No.: PCT/US2019/048239
§ 371 (c)(1),
(2) Date: Jun. 23, 2021

(87) PCT Pub. No.: WO2021/040693
PCT Pub. Date: Mar. 4, 2021

(65) Prior Publication Data
US 2022/0184879 A1      Jun. 16, 2022

(51) Int. Cl.
| | |
|---|---|
| *B29C 64/112* | (2017.01) |
| *B29C 64/393* | (2017.01) |
| *B41J 2/045* | (2006.01) |
| *B41J 2/21* | (2006.01) |
| *B33Y 10/00* | (2015.01) |
| *B33Y 30/00* | (2015.01) |
| *B33Y 50/02* | (2015.01) |

(52) U.S. Cl.
CPC .......... *B29C 64/112* (2017.08); *B29C 64/393* (2017.08); *B41J 2/04505* (2013.01); *B41J 2/2146* (2013.01); *B33Y 10/00* (2014.12); *B33Y 30/00* (2014.12); *B33Y 50/02* (2014.12)

(58) Field of Classification Search
CPC .. B29C 64/112; B29C 64/393; B41J 2/04505; B41J 2/2146; B33Y 10/00; B33Y 30/00; B33Y 50/02
USPC ....................................... 358/3.26, 1.9, 1.15
See application file for complete search history.

(56) References Cited

U.S. PATENT DOCUMENTS

| | | |
|---|---|---|
| 4,384,295 A | 5/1983 | Lewis et al. |
| 6,331,038 B1 | 12/2001 | Boleda et al. |
| 6,505,905 B1 | 1/2003 | Krouss |
| 6,517,197 B2 | 2/2003 | Hawkins et al. |
| 7,014,295 B2 | 3/2006 | Hickman et al. |
| 8,454,880 B2 | 6/2013 | Maalderink |
| 8,651,632 B2 | 2/2014 | Marcus et al. |

(Continued)

FOREIGN PATENT DOCUMENTS

| | | |
|---|---|---|
| JP | 2002-166530 A | 6/2002 |
| RU | 2640551 C1 | 1/2018 |
| WO | WO-2009153795 A1 | 12/2009 |

*Primary Examiner* — Quang N Vo
(74) *Attorney, Agent, or Firm* — Michael Dryja (57) ABSTRACT

A method for reducing artefacts in printed objects comprises receiving print data to be printed by a printhead arrangement, the printhead arrangement being movable in a print direction and comprising a plurality of printhead dies, wherein printhead dies adjacent to each other comprise an overlap area when viewed in the print direction. The print data to be printed are modified near and/or at the overlap areas between printhead dies of the printhead arrangement to compensate for drop placement.

16 Claims, 9 Drawing Sheets

(56) References Cited

U.S. PATENT DOCUMENTS

| | | |
|---|---|---|
| 8,814,300 B2 | 8/2014 | Shin et al. |
| 2015/0024233 A1 | 1/2015 | Gunther |
| 2015/0298454 A1* | 10/2015 | Fukazawa .............. B41J 2/0451 347/19 |
| 2018/0001568 A1 | 1/2018 | Sanchez Ribes et al. |
| 2018/0009171 A1 | 1/2018 | Donovan et al. |
| 2019/0129308 A1* | 5/2019 | Klimczak ............. G03F 7/0037 |
| 2019/0291435 A1* | 9/2019 | Rubio ..................... B41J 2/155 |

\* cited by examiner

Fig. 6d processed content to print

Fig. 6c masked version

Fig. 6b shifted version

Fig. 6a original content

MODIFYING PRINT DATA NEAR AND/OR AT OVERLAP AREAS BETWEEN PRINTHEAD DIES

BACKGROUND

Printing systems, such as 2D printing systems or 3D printing systems, are used to generate objects. 2D printing systems may generate 2D objects by printing ink drops in a two-dimensional pattern on a printing surface, such as a print medium. 3D printing systems may generate 3D objects by generating layers of two-dimensional patterns of ink drops on top of each other on a printing surface, such as a platen or platform, sometimes called print bed. Printing systems may comprise a printhead arrangement comprising a plurality of printhead dies. Adjacent printhead dies may overlap each other when viewed in a direction in which the printhead arrangement moves relative to the printing surface. Edges of printhead dies and the overlap areas between printhead dies may cause artefacts along the overlap area across the print object. For example, the artefacts may be visible in a 2D object, when printing area fillings, as well as in 3D objects.

BRIEF DESCRIPTION OF THE DRAWINGS

Examples will now be described with reference to the accompanying drawings, in which.

DETAILED DESCRIPTION

In the following detailed description, reference is made to the accompanying drawings. The examples in the description and drawings are to be considered illustrative and are not intended as limiting to the specific example or element described. Multiple examples may be derived from the following description and drawings through modification, combination of variation of certain elements.

Figure 1:
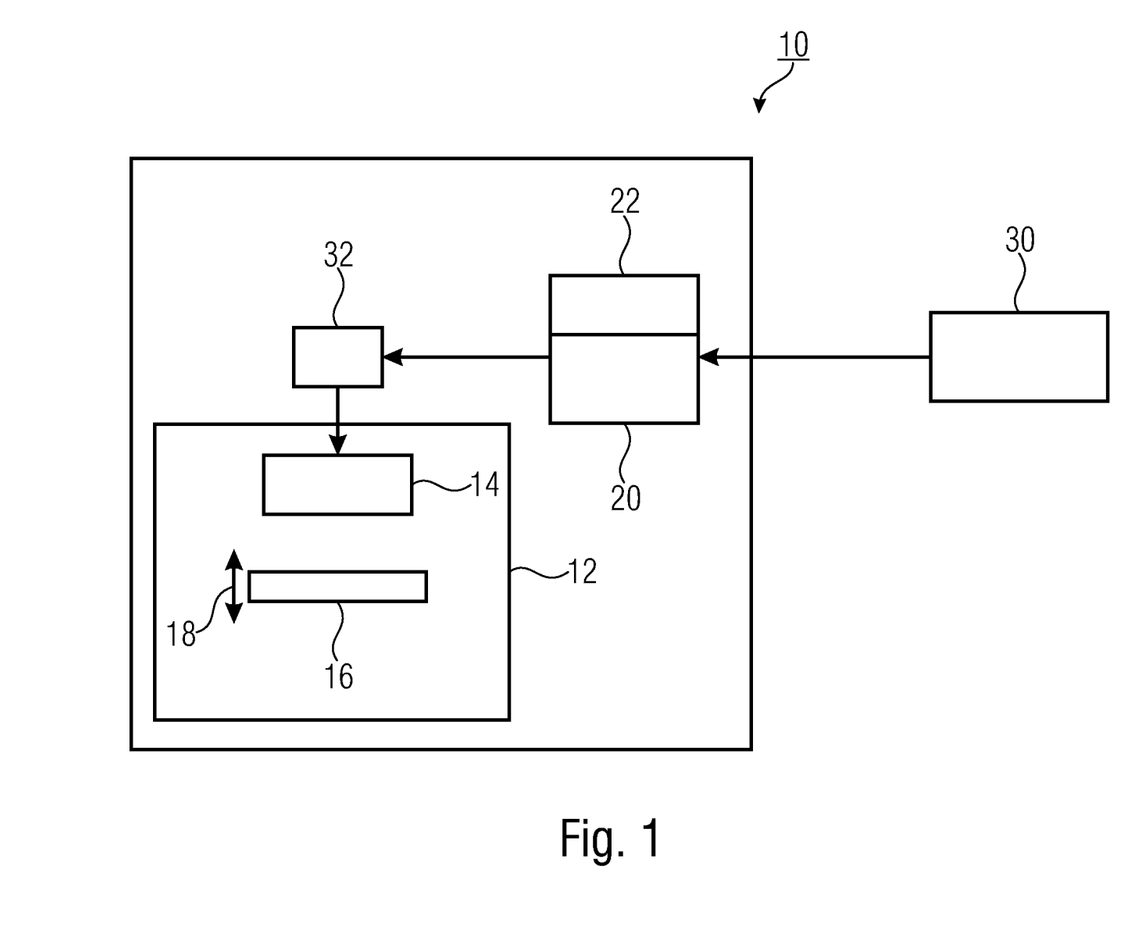
FIG. 1 is a schematic view of a printing system according to an example of the present disclosure.

FIG. 1 illustrates an example print system 10. The print system 10 may be a 2D print system or a 3D print system. Examples of the present disclosure are described hereinafter referring to 3D print systems, but corresponding teachings may be applied to 2D print systems as well. A 2D print system may be an inkjet printer to generate a two-dimensional object by applying ink or general marking liquid to a print medium. Examples of the present disclosure may be applied to reduce artefacts in trailing and/or leading edges of such two-dimensional print objects. An occurrence of artefacts may depend on a print mode of the print system. A 3D print system may create objects in three dimensions by printing an object layer by layer. An example of a 3D printer system involves shaping an object layer by layer in a carrier medium, build material, such as powder or granulate. For example, a layer of carrier medium is deposited and selected portions thereof are fused. For example, energy absorbant fusing agents or binder agents may be used during the print process. For example, when using binder agents, thermally or UV curable agents may be used. The print process is repeated layer by layer to build a solid object within the carrier medium. Fusing may be achieved, for example, by selectively depositing drops of a fusing agent to selected portions of the layer of carrier medium. In some examples, a further subsequent process may be to supply energy to the carrier medium on which an agent has been deposited to solidify the carrier medium in accordance with where the agent was deposited. Repeating these processes enables a three-dimensional object to be generated layer-by-layer, through selective solidification of portions of successive layers of carrier medium.

In order to generate the object, print system 10 comprises a printing machine 12. The printing machine 12 comprises a printhead arrangement 14. Printhead arrangement 14 may be to print on a printing surface 16. Printing on printing surface 16 may include ejecting drops of liquid material towards printing surface 16. Printhead arrangement 14 may be movable relative to printing surface 16 in a printing direction, which is parallel to printing surface 16. The printing surface may be called print bed.

In examples, print system 10 includes platen 16 to support the object and/or carrier medium such as powder or liquid. A set of walls or a container (not shown) may be provided around platen 16. The platen may provide the printing surface. A carrier medium dispenser (not shown) for depositing layers of carrier medium may be provided in print system 10, for example to dispense a layer of powder each time after a layer of an object has been bound, fused and/or solidified. In another example, printhead arrangement 14 is to print the object directly, for example by dispensing molten material, for example layer upon layer, without the use of a carrier medium dispenser. In another example, liquid carrier medium is used wherein the object is solidified layer upon layer at the surface of the liquid, and built up by a downwards stepping movement of the platen with respect to the liquid surface. Platen 16 may be movable in a vertical direction as indicated by an arrow 18 in FIG. 1. For example, platen 16 is to move with respect to printhead arrangement 14 to allow layer-by-layer solidification. In another example, the printhead arrangement 14 may be movable with respect to platen 16 and/or both printhead arrangement 14 and platen 16 are to move. In other examples, the print system 10 does not include a platen 16 or a container surrounding the platen. For example, print system 10 may be to print on another surface that is not an integral part of print system 10.

Print system 10 may include a processor 20 and machine readable medium 22. Machine-readable medium 22 may be encoded with instructions to perform the methods as described herein and to achieve the functionality described herein. Machine-readable medium 22 may also store print data describing an object to be printed, such as a 3D object, and/or modified print data describing a modified object to be printed. Processor 20 may be to execute instructions stored on machine-readable medium 22 to perform the methods described herein at least in part. Processor 20 may be implemented, for example, by one discrete module or a plurality of discrete modules, or data processing components, that are not limited to any particular hardware and machine-readable instructions configuration. Processor 20 may be implemented in any computing or data processing environment, including in digital electronic circuitry, e.g., an application-specific integrated circuit, such as a digital signal processor, DSP, or in computer hardware, device driver. In some implementations, the functionalities are combined into a single data processing component. In other implementations, the respective functionalities may be performed by a respective set of multiple data processing components. Machine-readable medium 22 may comprise a memory device or memory devices. The memory device or devices may include a tangible machine-readable storage medium or a plurality of tangible machine-readable storage media. Memory devices suitable for embodying these instructions and data include all forms of computer-readable memory, including, for example, semiconductor memory devices, such as EPROM, EEPROM, and flash memory devices, magnetic disks such as internal hard disks and removable hard disks, magneto-optical disks, and ROM/RAM devices. Routines and processes applied to printhead arrangement 14 to perform the methods described herein may be stored in the memory device.

In examples, printhead arrangement 14 dispenses liquid material layer by layer, to build, bind or solidify an object layer after layer. In examples, printhead arrangement 14 dispenses adhesive or reactive material to selectively fuse, bind or solidify a carrier medium. In examples, printhead arrangement 14 is movable in horizontal and/or vertical directions when dispensing or emitting material, respectively, in certain instances instead of or complementary to a moving printing surface 16. In examples, printhead arrangement 14 is a page-wide printhead arrangement capable to dispense or emit over an entire width of platen 16 to move in one direction. In other examples, printhead arrangement 14 is to scan in x and y directions, wherein the x- and y-axes are parallel to printing surface 16. In examples, printhead arrangement 14 may include an emitter for emitting electromagnetic waves or sound or heat waves in addition to dispensers for dispensing material.

Print data 30 defining an object to be printed may be received by printing system 10 and may be stored in machine-readable medium 22. Processor 20 may process or modify the received print data 30 to obtain modified print data 32. The modified print data 32 may be applied to printhead arrangement 14 in order to generate an object according to the modified print data 32.

In examples, print data 30 describe an original model representing an originally intended design to be produced as a printed object. For example, the original model may be a tangible model, or may be a virtual original model in the form of digital image data. In this disclosure, "virtual" may be interpreted as "digital". For example, the original model may be presented through a display to allow an end user or operator to choose such original model for printing. In examples, the original model may be presented through a third party website or application. In examples, the original model includes three dimensional image data and/or may include a two-dimensional image or a collection of two dimensional images to construe a three dimensional object layer by layer. In examples, the original model is communicated to the print system 10 in the form of digital print data, for example in a file format suitable for processing, conversion and/or printing by the print system 10. In one example, the original model may be stored on a computer readable medium, that may be part of the print system 10. In other instances, the computer readable medium may be a mobile non-volatile memory or may be part of a distant computing device such as a server, a database, etc. In examples, the original model may be presented by and/or downloadable from such distant computing device, for example through a third party website or application.

Figure 2:
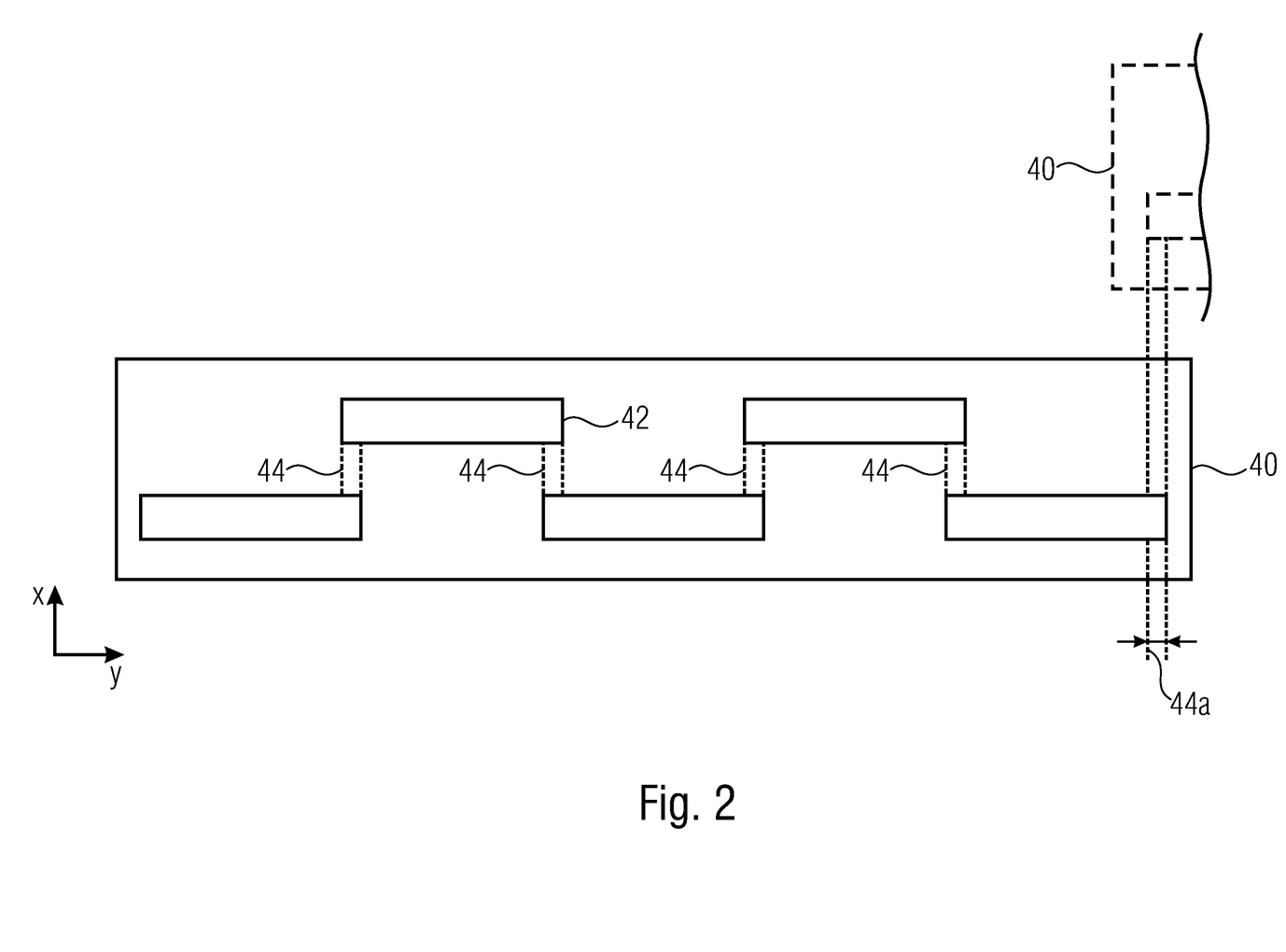
FIG. 2 is a simplified illustration of a printhead arrangement.

Printhead arrangement 14 may comprise a printhead having a plurality of printhead dies. FIG. 2 shows printhead arrangement 14 comprising a printhead 40 and a plurality of printhead dies 42. In examples, printhead arrangement 14 may comprise a plurality of printheads 40 as shown in broken lines in FIG. 2. The plurality of printheads 40 may be arranged in a staggered manner so that adjacent printheads 40 are overlapping when viewed in the printing direction x. The printhead dies 42 of printhead 40 are also arranged in a staggered manner so that adjacent printhead dies 42 are overlapping when viewed in the printing direction x. As shown in FIG. 2, adjacent printhead dies 42 are overlapping in an overlapping area 44. Printhead dies of adjacent printheads also overlap when viewed in the printing direction, as indicted at 44a in FIG. 2. As used herein, direction x is the printing direction, in which printhead arrangement 14 moves, direction y is the direction perpendicular to the direction x and parallel to the printing surface, and direction z is the vertical direction which is perpendicular to the printing surface. With respect to a build unit in which printing takes place, the xy plane is parallel to the print bed and direction z is perpendicular to the print bed.

Examples of the present disclosure relate to methods and apparatus to perform die overlap boundary compensation/calibration. It has been found that printing with a printhead arrangement comprising such overlapping printhead dies may result in artefacts, i.e. defects, at the boundaries, i.e., the overlapping areas, between adjacent printhead dies. Such artefacts may have a concave shape in a trailing edge and/or a leading edge of a printed object. For example, the artefacts may have a concave shape, i.e. a concave cross-section between overlapping print head dies. The occurrence of artefacts in an object may depend on a print mode of the print system. In a printed object having a plane trailing or leading edge, such artefacts may appear as vertical lines. Such artefacts seem to be related with aerodynamics generated under the printhead arrangement while printing. To be more specific, such aerodynamics appear to effect drop placement errors on the edges of the printhead dies. This issue is hard to model and is content dependent such that it is difficult to deal with the root cause thereof. Thus, examples of the present disclosure reduce or compensate such artefacts from a calibration/compensation point of view.

Figure 3A:
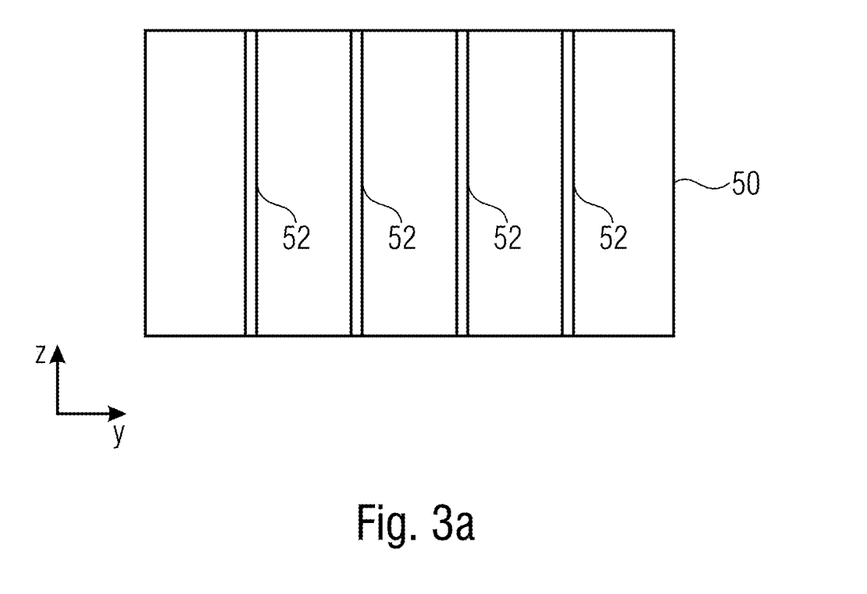
FIGS. 3a and 3b are a back view and a perspective view of an object printed by the printhead arrangement shown in FIG. 2.
Figure 3B:
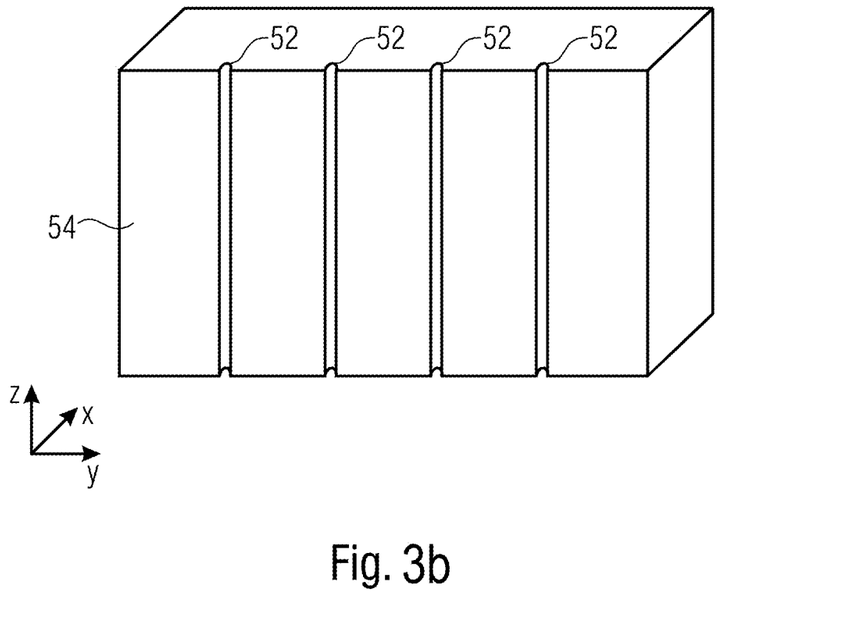

It was recognized that lines appear mostly on flat surfaces oriented in the yz plane of a build unit. FIGS. 3a and 3b show a back view and a perspective view of an object 50 generated using printhead 40 of FIG. 2. The original model of the object has a flat rear surface. As it is shown in FIGS. 3a and 3b, concave artefacts in the form of lines 52 appear in the rear surface 54, i.e. the trailing edge, of printed object 50. Lines 52 are located in the die overlap areas 44 and form marks on printed object 50 in the z direction. The spacing between lines 52 depend on the dimension of the printhead dies in the direction y. The thickness of each line 52 in the y direction depends on the dimension of the corresponding overlapping area of the printhead dies in this direction.

Examples of the present disclosure aim to reduce or compensate such lines on printed objects or parts and, therefore, to improve the printing process yield.

Reducing the aerodynamic effect may imply reducing the distance between the printhead arrangement and the printing surface. In 3D printers this distance is sometimes called Pen to Powder Space, PPS. At a lower level, reducing the aerodynamic effect may imply reducing moving speed of the printhead arrangement and/or reducing the liquid amount printed. It was found that such solutions have big implications. Lowering the distance between the printhead arrangement and the printing surface affects the printhead's health leading to a higher degradation. Lowering the moving speed directly impacts on the productivity of the printer. Reducing the amount of print agents impacts on the print mode recipe which may be optimized for best mechanical properties. Accordingly, solving aerodynamic turbulences from a system point of view is virtually unfeasible and has unacceptable tradeoffs. Small variations in the system may generate big variations in the model and, therefore, it is not possible to use a fixed compensation that works for all printers.

Thus, examples of the present disclosure propose a method that may reduce artefacts caused by aerodynamic turbulences on a per printer base. Examples permit a calibration that may be run by a customer on each individual system. Examples of the present disclosure compensate for effects physically seen on the surface of a part by filling the gaps that appear on those areas, at the boundaries or overlapping areas of the printhead dies, by generating additional drops that are fired in advance and that are expected to land in the designated area due to the turbulences.

Figure 4:
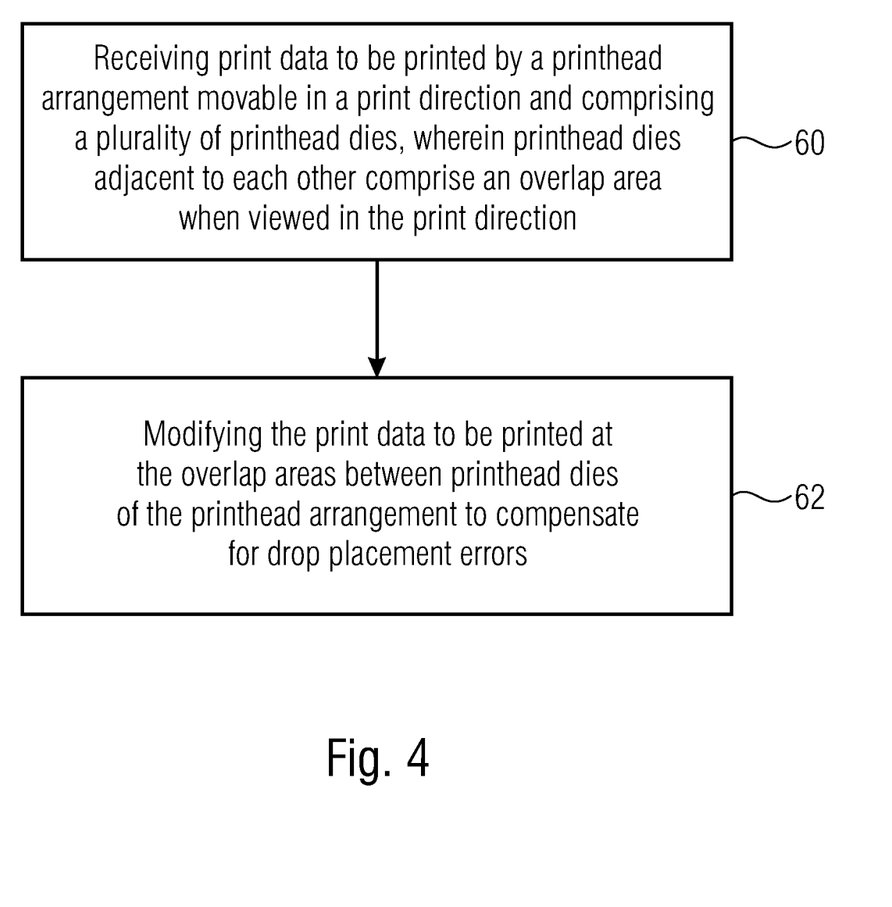
FIG. 4 is a flow diagram depicting a method according to an example of the present disclosure.

FIG. 4 shows a flowchart of an example of a method of the present disclosure. At 60, print data to be printed by a printhead arrangement, such as printhead arrangement 14 explained above, are received. The printhead arrangement is movable in a print direction and comprises a plurality of printhead dies, wherein printhead dies adjacent to each other comprise an overlap area when viewed in the print direction. At 62, the print data to be printed near and/or at the overlap areas between printhead dies of the printhead arrangement are modified to compensate for drop placement errors. For example, the drop placement errors may occur due to aerodynamic turbulence caused by a movement of the print head. The generated modified print data may be understood to be new print data as new pixels may be added to the original print data. The new pixels may define additional drops to be printed, when preforming a print job comprising the modified print data. Pixels are a digital representation of a portion of an image, i.e. of a 2D object or of a layer of a 3D object. When a pixel is printed, the pixel may be represented by multiple drops of ink/print agent, e.g. based on a halftoning process.

Modifying print data to be printed near and/or at the overlap areas between printhead dies permit artefacts at the trailing edge and/or the leading edge of the printed object to be reduced or minimized. In examples, modifying is performed such that the modified print data define a modified object to be printed, which comprises additional drops to be printed in the printing direction behind the trailing edge and/or before the leading edge of the original object at the positions of the concave artefacts, i.e. the positions of the artefacts in the y direction which is the direction perpendicular to the printing direction. Modifying the print data may comprise shifting the print data an amount of pixels. The amount of shifted pixels may determine an amount of additional drops to be printed, when performing the print job using the modified print data. Stated differently, when the term "shifting pixels" is used, it refers to modify the print data, while printing additional drops refers to printing a modified object using the modified print data, wherein the modified object may comprise additional printed drops when printed. Since the additional drops may be printed in the printing direction behind the trailing edge of the original object the same are printed in advance. The additional drops are printed such that droplets to print the same land in the area of the artefacts due to the aerodynamic turbulence. The position of the additional drops to be printed and how the additional drops are to be printed may be determined during a calibration of the associated printer or printing system, wherein calibration may be performed by the manufacturer of the printer or printing system or by a user or operator.

Figure 5:
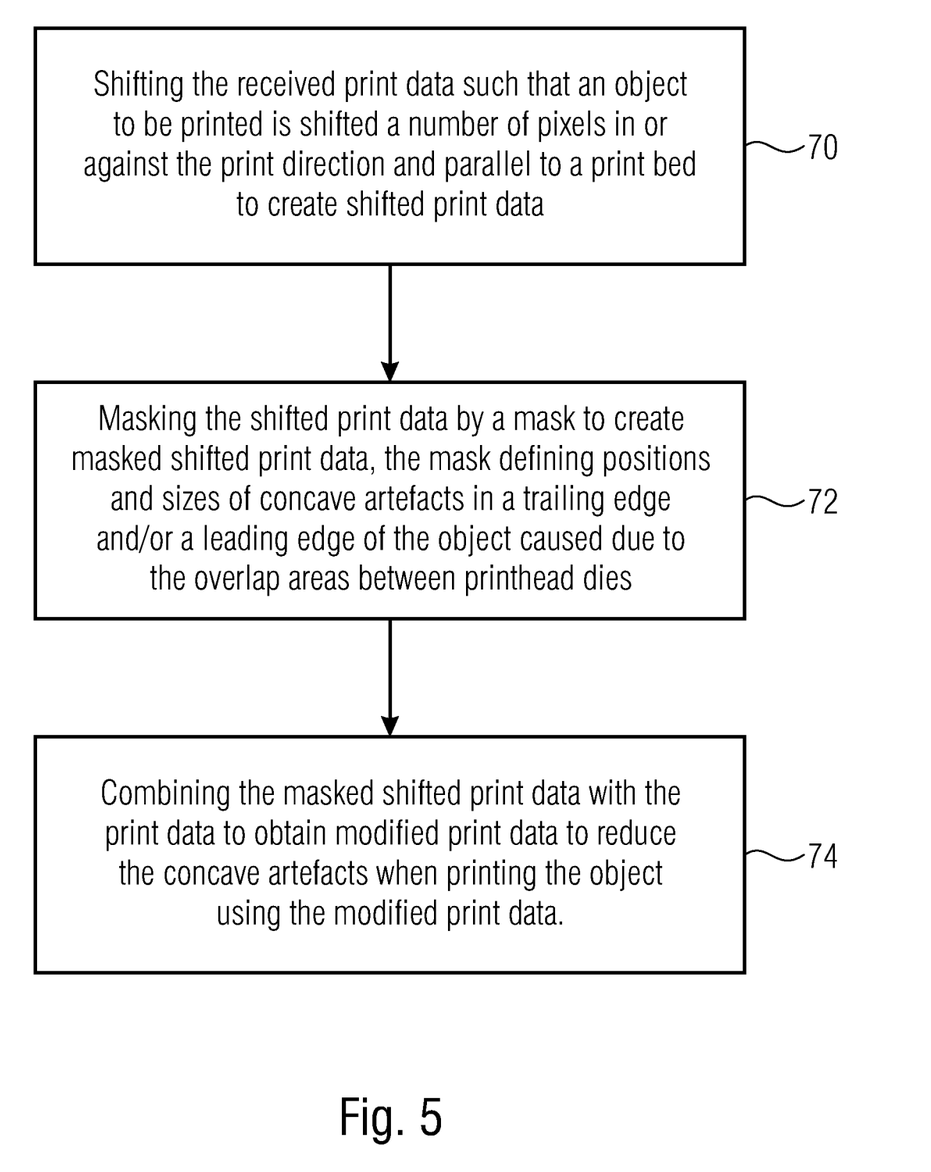
FIG. 5 is a flow diagram depicting details of a method of modifying print data according to an example of the present disclosure.

An example of how the print data may be modified according to the present disclosure is shown in FIG. 5. At 70, the received print data are shifted such that an object to be printed is shifted a number of drops in or against the print direction and parallel to a print bed to create shifted print data, i.e. the received print data are shifted a number of pixels. At 72, the shifted print data are masked by a mask to create masked shifted print data, the mask defining positions and sizes of concave artefacts in a trailing and/or a leading edge of the object caused due to the overlap areas between printhead dies. At 74, the masked shifted print data are combined with the print data to obtain modified print data to reduce the concave artefacts when printing the object using the modified print data.

Shifting the print data and masking the shifted print data as described above permits determining the additional pixels which determine additional drops to be printed in order to reduce or compensate the artefacts of a printed object in a simple manner. The number of pixels by which the print data defining the object is shifted depends on a deepness of concave artefacts that are printed if the original model is printed by the printing system. The positions and sizes of the concave artefacts may correspond to the positions and sizes of the overlapping areas of the printhead arrangement. Thus, in examples, the mask defines the location and the size of the overlap areas.

In examples, masking the shifted print data comprises loading a stored mask file and applying the mask file to the shifted print data. In examples, the mask file may include additional information defining as to how additional drops to reduce or compensate the artefacts are to be printed, i.e. mask file may include additional information defining shifted pixels. Such additional information may include a halftone level with which respective drops of the shifted pixels are to be printed or may define sizes of additional ink drops to print the additional pixels.

In examples, the print data are 3D print data and comprise print data associated with a plurality of layers of a 3D object to be printed. The method may comprise modifying the print data layer by layer, wherein the print data associated with each layer are shifted by the same amount or by different amounts of pixels. In examples, each layer may be shifted by the same amount of additional drops to be printed upon calibration of the printer. In examples, different layers may be shifted by a different amount of additional drops to be printed during calibration of the printer in order to find out which amount of additional drops to be printed achieves the best results. In other words, in examples, different layers of a 3D object are printed with different numbers of additional drops, each referring to different numbers of shifted pixels, wherein the number of pixels associated with a layer having the smallest artefacts is determined as the number of pixels to be used in following regular print jobs. The number of pixels determines a number of additional drops to be printed.

In examples, the positions and sizes of the overlapping areas between print head dies of the printhead arrangement are stored in the mask file as the positions and sizes of the concave artefacts. The sizes may be different for different overlapping areas between printhead dies. In examples, a calibration object is printed during a calibration of the printing system, positions and sizes of the concave artefacts of the printed object are obtained from the printed calibration object and the obtained positions and sizes of the concave artefacts are stored in the mask file. In examples, calibrating the printing system further comprises printing a calibration object using the printing system comprising the printhead arrangement, wherein the calibration object may correspond to unmodified print data, i.e., print data that were not modified to reduce or compensate drop placement errors. The number of pixels by which the print data is to be shifted to obtain a shifted printed object may then be determined depending on a deepness of concave artefacts of the object printed using the unmodified print data and the determined number of pixels may be stored to be used when performing following regular print jobs.

In examples, the method comprises printing calibration objects, wherein the one or more calibration objects are arranged one after the other along the print direction and/or on top of each other. For printing the calibration objects calibration print data associated with the calibration objects may be used. The calibration print data associated with the calibration objects are generated by applying modifications to modify calibration object print data associated with an original calibration object. The modifications comprise shifting the calibration object print data by a different number of pixels in or against the print direction; and/or applying different masks defining different sizes and/or positions of overlap areas between printhead dies to the calibration object print data; and/or using different halftone levels and/or shapes of drops to print additional drops behind a trailing edge and/or before a leading edge of the original calibration object. After printing different calibration objects a best calibration object may be determined. The best calibration object is defined by determining the calibration object of the printed calibration objects having the least artefacts due to drop placement errors. For example, the drop placement errors may occur due to aerodynamic turbulence caused by a movement of the print head. Determining the best calibration object may be performed by a user or an operator or automatically by an inspection system which may be used to detect the results of the different modifications automatically during calibration. For example, the inspection system may be a 3D scanner. The original calibration object may be predetermined by a manufacturer of the printing system and may be stored within the printing system. The modifications associated with the best calibration object are used in following print jobs. Stated differently, by applying the modifications associated with the best calibration object to the print data of a following print job, the print data may be modified automatically to obtain modified print data which may be used for printing a modified object. Further, each calibration object may be printed anywhere along the print direction and/or anywhere along a direction being perpendicular to the print bed. In doing so, optimal modifications with respect to a position anywhere across the print bed may be found. When applying the modification associated with the best calibration object to print data of a print job in an object having reduced visible artefacts may result. For example, printing an object by using different halftone levels to print additional drops a perceived sharpness of a surface of the printed object through the human eye may be improved. For example, printing an object by using different shapes of drops to print additional drops the perceived sharpness of a surface of the printed object may also be improved. For example, when using thermal printheads, firing parameters may be modified to modify the shapes of drops. For example, the firing parameters may comprise forcing to print more aerosol like drops. For example, when using piezo technology the shapes of drops may be modified by changing a drops size.

As explained above, in examples, the modified print data define a modified object to be printed, which comprises additional drops at the positions of the concave artefacts in the printing direction behind the trailing edge and/or before the leading edge of the original object. In such examples, the method may further comprise determining parameters of additional drops to be printed using the modified print data comprising the additional pixels. Determining parameters of drops used to print the additional drops may comprise at least one of: determining the size and position of the additional drops to be printed depending on the positions and sizes of the concave artefacts; and/or determining halftone levels of additional drops to be printed; and/or adjusting the size of additional drops to be printed to increase towards the trailing and/or the leading edge of the 3D object. In examples, such parameters may be determined during the calibration of the printing system. Parameters to be used in following regular printing may be stored along with the mask file as additional information. Thus, examples of the present disclosure allow to adapt printing of the additional drops by adapting the number of shifted pixels with a high degree of fineness to artefacts experienced during calibration of the printing system.

Examples of the present disclosure relate to a machine-readable medium having stored thereon a set of machine-readable instructions that, when executed, cause a processor to perform the methods disclosed herein. In examples, the machine-readable medium may be the machine-readable medium 22 shown in FIG. 1. In examples, the machine-readable medium may be a machine-readable medium separate from the printing system. Examples of the present disclosure relate to an apparatus comprising such a machine-readable medium and a processor. Such an apparatus may be integrated in a printing system as shown in FIG. 1 or may be separate from a printing system. If separate from the printing system, the apparatus may be to provide the modified print data to the printing system. Examples provide a printing system comprising such an apparatus including a processor 20 and a machine-readable medium 22.

In examples, the print data are 3D print data and a printing system is a 3D printing system. In such examples, the concave artefacts may have the form of lines on a rear surface of a 3D object. In examples, the print data are modified at a layer basis to fill the concave gap in each layer so that the lines otherwise appearing in the 3D object are filled. FIGS. 6a to 6d shows schematic top views for explaining how the print data of one layer are modified according to an example. FIGS. 6a to 6d show views of the object layer from above, that is onto the plane of the printing surface, which is parallel to the xy plane.

Figure 6A:
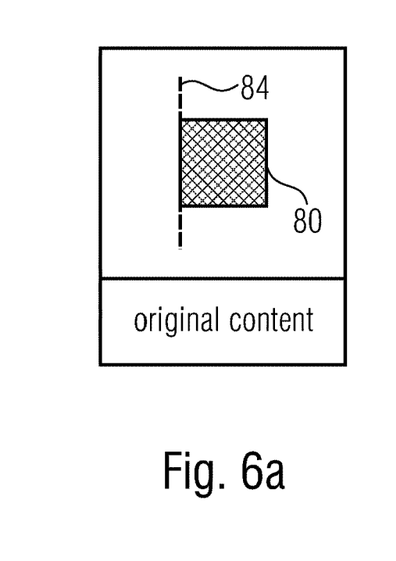
FIGS. 6a to 6d show schematic illustrations to visualize a method of modifying print data according to an example of the present disclosure.
Figure 6B:
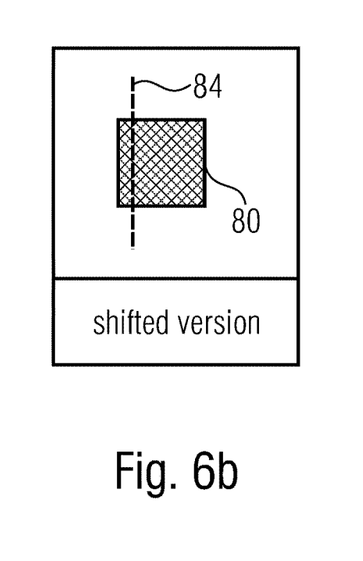
Figures 6C, 6D:
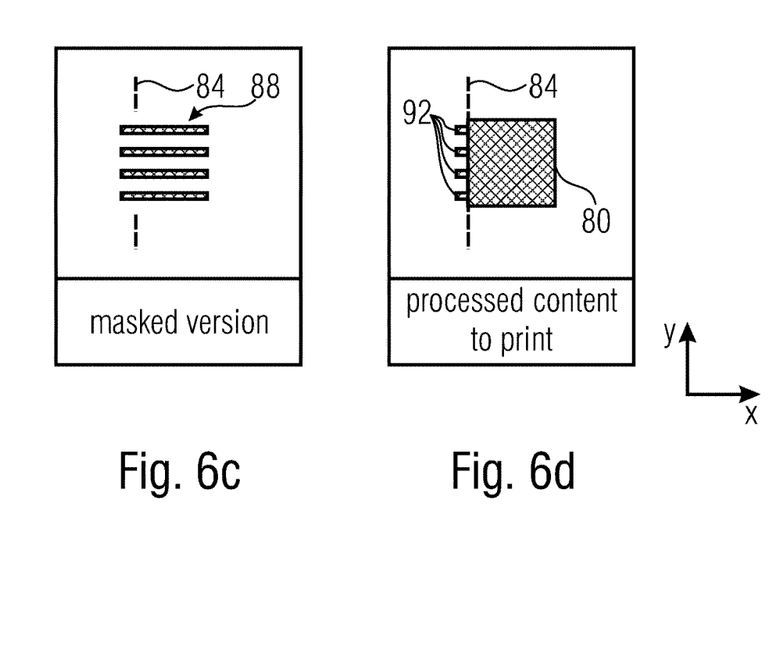

FIG. 6a shows a layer 80 representing an original content. In the example shown layer 80 is square shaped. A printing direction is in the positive x direction. A trailing edge of layer 80 is indicated by a broken line 84. The content of the layer 80 is shifted against the printing direction, i.e., in the negative x direction in the example shown, by shifting the print data a certain number of pixels. The shifted version 86 of the layer is shown in FIG. 6b. The number of pixels depends on how deep the concave artefacts, i.e., the imprints on the printed part without modification, are. Then, the shifted version 86 of the layer is masked with a mask that contains the locations and widths of the imprints, i.e. the concave artefacts. The shifted version 86 of the layer is associated with the shifted print data. As explained above, the mask may contain the locations and widths of the overlapping areas of the printhead dies of the printhead arrangement. The masked version 88 of the shifted layer is shown in FIG. 6*c*. Finally, the masked version 88 is added to the original content to obtain the processed content to print. When adding the masked version 88 of the shifted layer to the original content parts of the masked version behind the trailing edge of the original layer 80 may be added to the original content while other parts are not added. In examples, data associated with the original content 80 and data associated with the masked version may be subjected to an OR conjunction for each pixel. FIG. 6*d* shows the modified layer 90 comprising a part corresponding to the original layer 80 in front of the trailing edge 84 and comprising another part including additional pixels 92 behind the trailing edge 84. Thus, extra pixels were introduced to the modified print data to effectively fill gaps in the original layer 80 that will generated by the turbulence. Thus, concave artefacts due to such gaps may be reduced or compensated. In examples, the same procedure may be done with respect to a leading edge, which however is not shown in the FIGS. 6*a* to 6*d*.

As the printhead arrangement moves in the positive x direction with respect to the printing surface, i.e. platen or print bed, the additional pixels 92 are printed in advance when printing the processed content, i.e., the modified layer. The mask indicates the positions and the sizes of the imprints in the y direction and comprises a band at the position of each imprint, the width, in the y direction, of each band corresponding to the width of the corresponding imprint. The band extend in the x direction as the printhead arrangement moves in the x direction. The mask used in FIG. 6*c* may be suited for the printhead arrangement 40 shown in FIG. 2, which comprises four overlapping areas 44.

Figure 7:
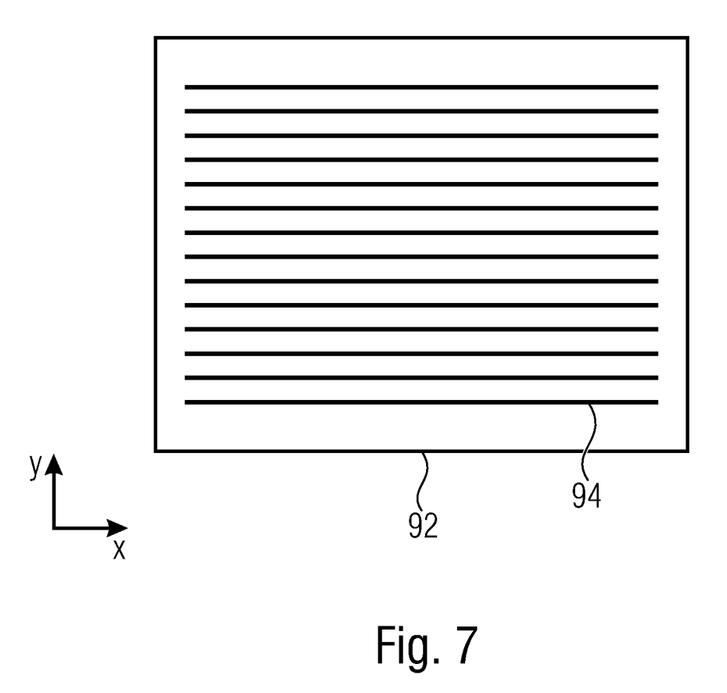
FIG. 7 illustrates an example of a mask according to an example.

FIG. 7 shows an example of a line mask 92 usable for a printhead arrangement comprising a number of fourteen overlapping areas. Thus, line mask 92 comprises fourteen lines 94 at the positions of the fourteen printhead die overlapping areas in the y direction. The width of each line 94 corresponds to the dimension of the associated die overlapping area in the y direction. The line mask may be used to apply compensation in these overlapping areas. The location of each overlap area is a function of the nominal die position and the result of a printhead arrangement position alignment calibration result. Thus, the information given in the line mask may be obtained during calibration of the printing system which comprises the printhead arrangement.

For each layer of a plurality of layers of a 3D object, the shifted version of the content, see, for example, FIG. 6*b*, may be stored and used along with a mask file loaded for this layer to generate the drops to print that layer. For each layer, previous content may be cleared, the mask may be reloaded and the shifted version of the content may be stored. In this manner, each layer of the plurality of layers of a 3D object is processed to achieve a compensation of the imprints otherwise appearing on the rear surface of the object.

Thus, in examples of the present disclosure, during the processing of each of the layers, the layer content is taken and shifted against the printing direction to overgrow each printed part on the trailing edge and/or the leading thereof. The number of pixels by which the associated print data of the layer content is shifted is correlated with the thickness of the deepness of the gap that is to be filled. In examples, the associated print data of the layer content may be shifted by one, two, three or even more pixels.

Figure 8:
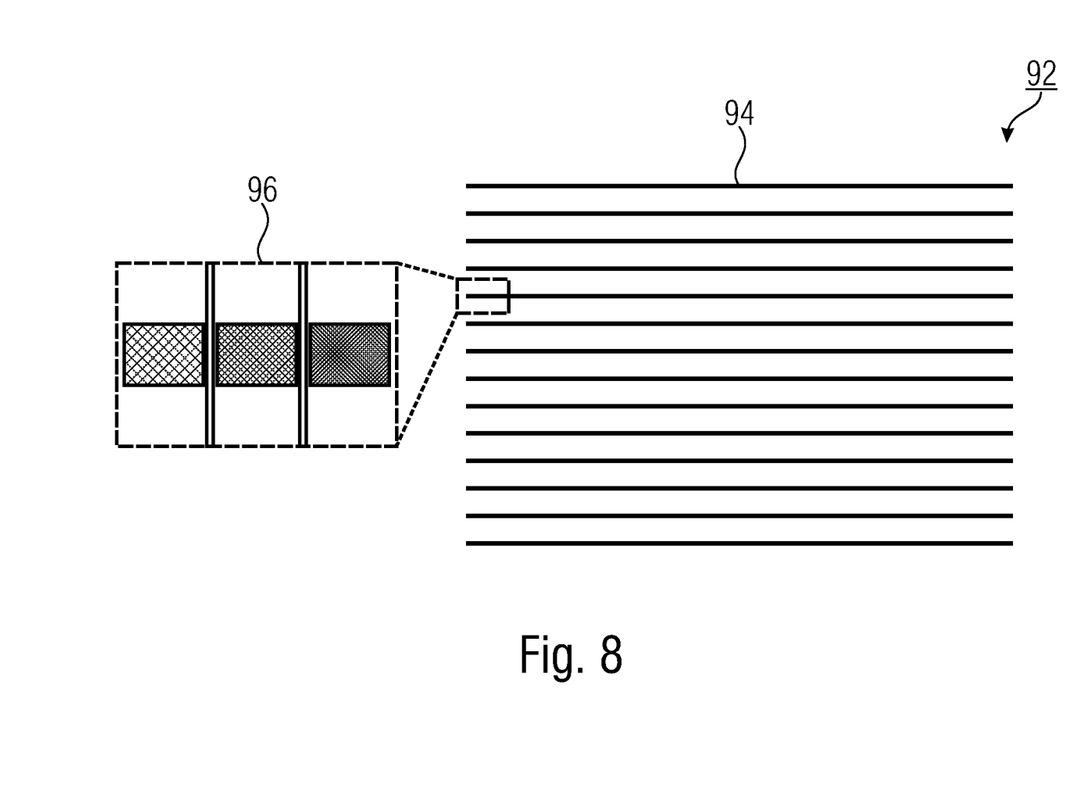
FIG. 8 illustrates the mask of FIG. 7 and different halftone levels.

Different parameters may be used to compensate the artefacts caused by aerodynamic turbulences near and/or at areas of overlapping printhead dies, which are in the form of concave artefacts, i.e., imprints. A deepness of the imprints may be tuned with the number of shifted pixels determining the number of additional drops to be printed. Size and position of the imprints may be modeled by the position of the bands and their thickness in the line mask. As a further parameter, the lines on the mask may be halftoned, i.e. dots of different sizes and/or different spacing may be used. As a further parameter, some tapering may be applied to increment the effect of the compensations on the sides of the bands. For example, FIG. 8 shows line mask 92 with lines 94, wherein an incremental compensation of 50%, 75%, and 100% is shown in FIG. 8 at 96 from left to right. In examples, the size of additional drops, i.e. dots, to print the additional pixels may increase towards the trailing edge and/or the leading edge of the 3D object.

Figure 9:
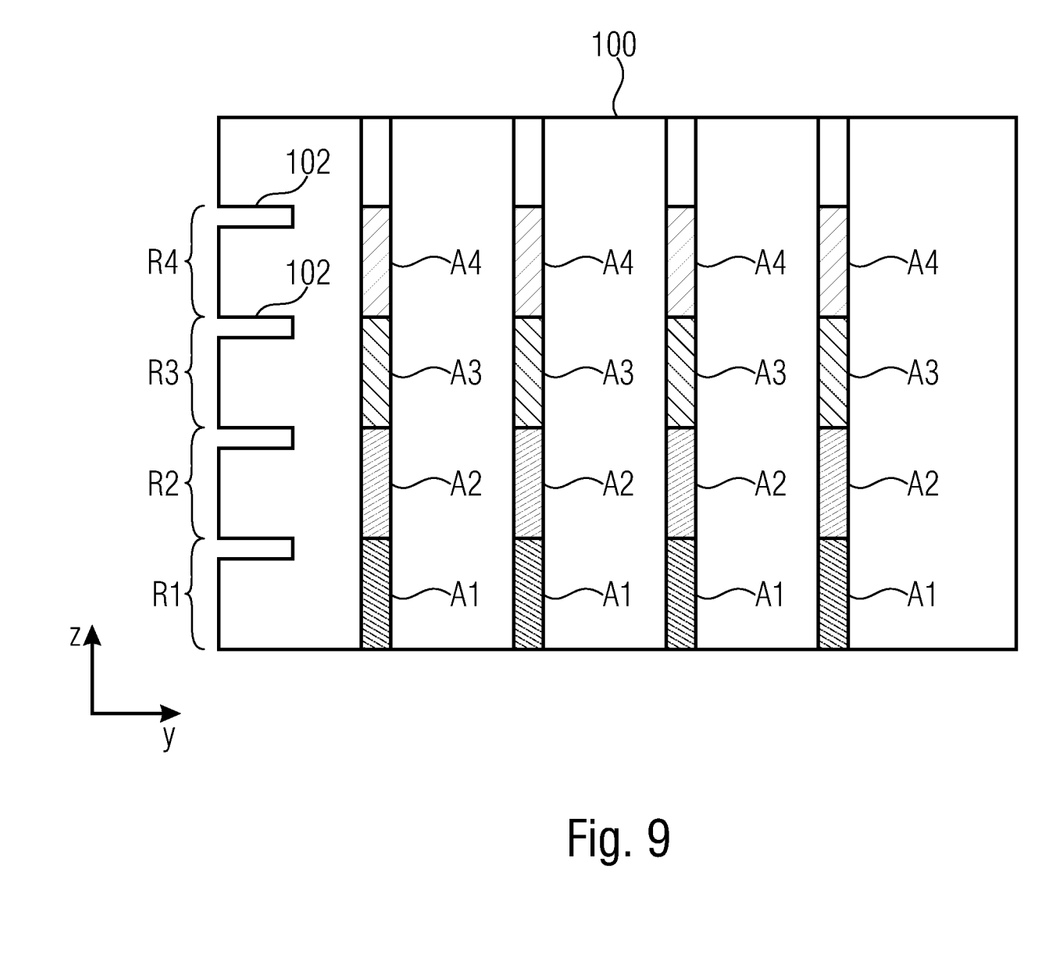
FIG. 9 illustrates a back view of an object printed using different pixels shifts for calibration purposes.

In examples of the present disclosure, a calibration part comprising a vertical wall oriented in the yz plane may be used to find the proper amount of pixels by which the original content, i.e. the print data associated with the original object, is to be shifted. An example of such a calibration part 100 is shown in FIG. 9, wherein FIG. 9 shows a back view of the calibration part 100. The calibration part comprises different regions R1, R2, R3 and R4 in the z direction. The regions may be separated by respective indents 102. Each region may comprise a certain number of layers. The layers of each region R1, R2, R3 and R4 may be generated, i.e. printed, using a different pixel shift. In each of the regions, the same mask is used. Thus, in each of the regions, a different modification of the original layers takes place.

Region R1 may be generated without applying any correction, i.e., with a shift of zero pixels. Region R2 may be generated with a shift of three pixels, region R3 may be generated with a shift of two pixels, and region R4 may be generated with a shift of one pixel. In region R1, imprints A1 may occur as explained above. In region R2, protruding lines A2 may appear due to an overcompensation. Thus, a shift by more than the appropriate number of pixels may result in an opposite defect, which may help to check whether the positions and sizes in the mask are well defined and whether the compensation takes place in the correct position and with the correct size. In region R2, less protruding lines A3 may appear due to a reduced overcompensation. In region R4, the imprints occurring without correction may be substantially compensated so that areas A4 may be substantially flat with the remaining parts of region R4. Thus, in this case, a pixel shift of one pixel achieves the best result. In other words, the layers of region R4 have the smallest artefacts. Thus, a pixel shift of one pixel may be used in following regular print jobs. Of course, these results are mere examples.

In examples, a user, such as a customer or a service engineer, may evaluate which of the regions of the calibration part shows the lowest level of defect and may retrofit the pixel shift associated with the region having the lowest level of defect back to the printer. This pixel shift may then be used in following regular print jobs.

In examples, the position and the size of the concave artefacts, such as the bands in case of a flat rear surface, which are defined in the mask, are determined by the overlap areas, which may be corrected by an alignment during the original calibration of the printer or printing system. Thus, the mask may be defined during the original calibration and is not changed by an operator, such as a user or service engineer. In other examples, an operator of a printing system may be given the possibility to change the content of the mask by performing a calibration procedure to detect or correct the positions and sizes of the defects and to change the mask accordingly.

In examples of the present disclosure, a transformation file may be formed which includes the information to modify the print data of an object be printed in order to reduce or compensate the defects caused by the aerodynamic turbulences due to the overlapping areas between printhead dies. In examples, the transformation file may include the mask file, i.e. information about the position and size of the defects, and information indicating the number of pixels the object is to be shifted. In examples, the information file includes additional information on how additional drops are to be printed to obtain the addition pixels as described above. In examples, the transformation file may include such information common to all layers that may be printed by the printing machine. In examples, the transformation file may include separate information for each layer.

In examples, the defects may be inspected visually by a user during calibration. Illuminating the calibration part during calibration may be helpful in recognizing the defects and the effects on different shiftings during calibration. In examples, an inspection system may be used to detect the results of the different shiftings automatically during calibration, for example, the inspection system may be a 3D scanner.

In examples, the compensation parameters determined during calibration of the printing system are used in performing following print jobs. This may result in reduced or minimized artefacts on rear surfaces of any object printed by the printing system. Defects in surfaces different from flat rear surfaces may also be compensated using the approach disclosed herein.

Examples relate to a non-transitory machine-readable storage medium encoded with instructions executable by a processing resource of a computing device to perform methods described herein.

Examples described herein may be realized in the form of hardware, machine-readable instructions or a combination of hardware and machine-readable instructions. Any such machine-readable instructions may be stored in the form of volatile or non-volatile storage such as, for example, a storage device, such as a ROM, whether erasable or rewritable or not, or in the form of memory such as, for example, RAM, memory chips, device or integrated circuits or an optically or a magnetically readable medium, such as, for example, a CD, DVD, magnetic disk or a magnetic tape. The storage devices and storage media are examples of machine-readable storage, that are suitable for storing a program or programs that, when executed, implement examples described herein.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

In the foregoing Detailed Description, it may be seen that various features are grouped together in examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with another claim or other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

The above described examples are merely illustrative for the principles of the present disclosure. It is understood that modifications and variations of the arrangements and the details described herein will be apparent to others skilled in the art. It is the intent, therefore, to be limited by the scope of the pending patent claims and not by the specific details presented by way of description and explanation of the examples herein.

The invention claimed is:

1. A method performed by a processor and comprising:
   receiving print data for an original calibration object to be printed by a printhead arrangement movable in a print direction and comprising a plurality of printhead dies, wherein adjacent printhead dies comprise an overlap area when viewed in the print direction;
   generating print data for calibration objects by modifying the print data for the original calibration object to be printed near and/or at the overlap areas between printhead dies of the printhead arrangement to compensate for drop placement errors, by:
      shifting the print data for the calibration object by a different number of pixels in or against the print direction, and/or
      applying different masks defining different sizes and/or positions of the overlap area between the adjacent printhead dies to the print data for the original calibration object, and/or
      using different halftone levels and/or shapes of drops to print additional drops behind a trailing edge and/or before a leading edge of the original calibration object;
   printing the calibration objects using the generated print data;
   determining a best calibration object of the printed calibration objects having fewest artifacts due to drop placement errors; and
   using modifications associated with the best calibration object in subsequent print jobs.

2. The method according to claim 1, wherein the additional drops are printed at the positions of concave artifacts in the printing direction behind the trailing edge and/or before the leading edge of the original calibration object.

3. The method according to claim 1, wherein applying the different masks comprises loading one or more stored mask files for the different masks.

4. The method of claim 3, wherein the print data for the original calibration object are 3D print data and comprise print data associated with a plurality of layers of a 3D calibration object, wherein the print data for the calibration objects are generated layer by layer in a same or different manner.

5. The method of claim 3, wherein the one or more stored mask files include positions and sizes of concave artifacts.

6. The method of claim 1, wherein the original calibration object and the calibration objects are each a 3D calibration object having a number of layers, different layers of the 3D calibration object are printed with different numbers of additional drops, and the number of additional drops associated with a layer having smallest artifacts is determined as the number of additional drops to be printed.

7. The method of claim 1, wherein the generated print data for the calibration objects comprise the additional drops to be printed at positions of concave artifacts in the printing direction behind the trailing edge and/or before the leading edge of the original calibration object, and the print data for the calibration objects are generated by:
  determining sizes and positions of the additional drops to be printed depending on the positions and sizes of the concave artifacts, and/or
  determining the different halftone levels of the additional drops to be printed, and/or
  adjusting the sizes of the additional drops to be printed to increase towards the trailing edge and/or the leading edge.

8. A non-transitory machine-readable medium storing instructions executable by a processor to perform processing comprising:
  receiving print data for an original calibration object to be printed by a printhead arrangement movable in a print direction and comprising a plurality of printhead dies, wherein adjacent printhead dies comprise an overlap area when viewed in the print direction;
  generating print data for calibration objects by modifying the print data for the original calibration object to be printed near and/or at the overlap areas between printhead dies of the printhead arrangement to compensate for drop placement errors, by:
    shifting the print data for the calibration object by a different number of pixels in or against the print direction, and/or
    applying different masks defining different sizes and/or positions of the overlap area between the adjacent printhead dies to the print data for the original calibration object, and/or
    using different halftone levels and/or shapes of drops to print additional drops behind a trailing edge and/or before a leading edge of the original calibration object;
  printing the calibration objects using the generated print data;
  determining a best calibration object of the printed calibration objects having fewest artifacts due to drop placement errors; and
  using modifications associated with the best calibration object in subsequent print jobs.

9. The non-transitory machine-readable medium according to claim 8, wherein the additional drops are printed at the positions of concave artifacts in the printing direction behind the trailing edge and/or before the leading edge of the original calibration object.

10. The non-transitory machine-readable medium according to claim 8, wherein applying the different masks comprises loading one or more stored mask files for the different masks.

11. The non-transitory machine-readable medium according to claim 10, wherein the print data for the original calibration object are 3D print data and comprise print data associated with a plurality of layers of a 3D calibration object, wherein the print data for the calibration objects are generated layer by layer in a same or different manner.

12. The non-transitory machine-readable medium according to claim 10, wherein the one or more stored mask files include positions and sizes of concave artifacts.

13. The non-transitory machine-readable medium according to claim 8, wherein the original calibration object and the calibration objects are each a 3D calibration object having a number of layers, different layers of the 3D calibration object are printed with different numbers of additional drops, and the number of additional drops associated with a layer having smallest artifacts is determined as the number of additional drops to be printed.

14. The non-transitory machine-readable medium according to claim 8, wherein the generated print data for the calibration objects comprise the additional drops to be printed at positions of concave artifacts in the printing direction behind the trailing edge and/or before the leading edge of the original calibration object, and the print data for the calibration objects are generated by:
  determining sizes and positions of the additional drops to be printed depending on the positions and sizes of the concave artifacts, and/or
  determining the different halftone levels of the additional drops to be printed, and/or
  adjusting the sizes of the additional drops to be printed to increase towards the trailing edge and/or the leading edge.

15. An apparatus comprising:
  a processor; and
  the non-transitory machine-readable medium of according to claim 8.

16. A 3D print system comprising a 3D printing machine comprising the printhead arrangement and the apparatus of claim 8.

* * * * *